United States Patent
Ohsuga

(10) Patent No.: US 9,495,579 B2
(45) Date of Patent: Nov. 15, 2016

(54) FACE DETECTION APPARATUS, FACE DETECTION METHOD, AND PROGRAM

(71) Applicant: AISIN SEIKI KABUSHIKI KAISHA, Kariya-shi, Aichi-ken (JP)

(72) Inventor: Shin Ohsuga, Nagoya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 46 days.

(21) Appl. No.: 14/510,379

(22) Filed: Oct. 9, 2014

(65) Prior Publication Data

US 2015/0098634 A1 Apr. 9, 2015

(30) Foreign Application Priority Data

Oct. 9, 2013 (JP) ................................. 2013-211633

(51) Int. Cl.
*G06K 9/00* (2006.01)

(52) U.S. Cl.
CPC ....... *G06K 9/00261* (2013.01); *G06K 9/00255* (2013.01); *G06K 9/00281* (2013.01); *G06K 9/00845* (2013.01)

(58) Field of Classification Search
None
See application file for complete search history.

(56) References Cited

U.S. PATENT DOCUMENTS

| 5,323,470 A | * | 6/1994 | Kara | ...................... B25J 9/1697 348/169 |
|---|---|---|---|---|
| 8,351,658 B2 | | 1/2013 | Adachi et al. | |
| 2010/0238034 A1 | | 9/2010 | Gunaratne | |

FOREIGN PATENT DOCUMENTS

| JP | 2715511 B2 | | 2/1998 | |
|---|---|---|---|---|
| JP | 2008-192100 A | | 8/2008 | |
| JP | 2008-226047 A | | 9/2008 | |
| KR | 20020007744 | * | 1/2002 | ............. G06T 17/00 |

OTHER PUBLICATIONS

"Handbook of Face Recognition", Springer, 2011, p. 124-133.
Communication dated Apr. 10, 2015 from the European Patent Office in counterpart application No. 14187887.6.
Tong et al: "Robust facial feature tracking under varying face pose and facial expression", Pattern Recognition, Elsevier, GB, vol. 40, No. 11, Jun. 29, 2007, pp. 3195-3208.
L M Bergasa et al: "Facial Features Tracking Applied to Drivers Drowsiness Detection", Proceedings of the 21st IASTED International Conference, Feb. 10, 2003, pp. 231-236.

(Continued)

*Primary Examiner* — Eueng-Nan Yeh
(74) *Attorney, Agent, or Firm* — Sughrue Mion, PLLC

(57) ABSTRACT

A face detection apparatus detecting a face from an image including the face of a target person in a region imaged by an imaging unit, includes: a model fitting unit generating a first model of the face based on a first image from the imaging unit; a tracking unit fitting the first model to a second image from the imaging unit; a position detection unit detecting positions of face parts based on the second image; and a comparison unit determining whether or not a deviation occurs between the positions of the face parts in the first model fitted by the tracking unit and the positions of the face parts detected by the position detection unit. When the comparison unit determines that the deviation occurs, the model fitting unit generates a second model of the face based on the second image.

7 Claims, 9 Drawing Sheets

(56) References Cited

OTHER PUBLICATIONS

Wang J M et al: "Extracting drivers facial features during driving", Intelligent Transportation Systems (ITSC), 2011 14th International IEEE Conference on, IEEE, Oct. 5, 2011, pp. 1972-1977.

Communication dated Aug. 5, 2016, from the European Patent Office in counterpart European Application No. 14187887.6.
Zhiwei Zhu et al: "Real Time 3D Face Pose Tracking From an Uncalibrated Camera", Jun. 27, 2004, pp. 8 pages total.

* cited by examiner

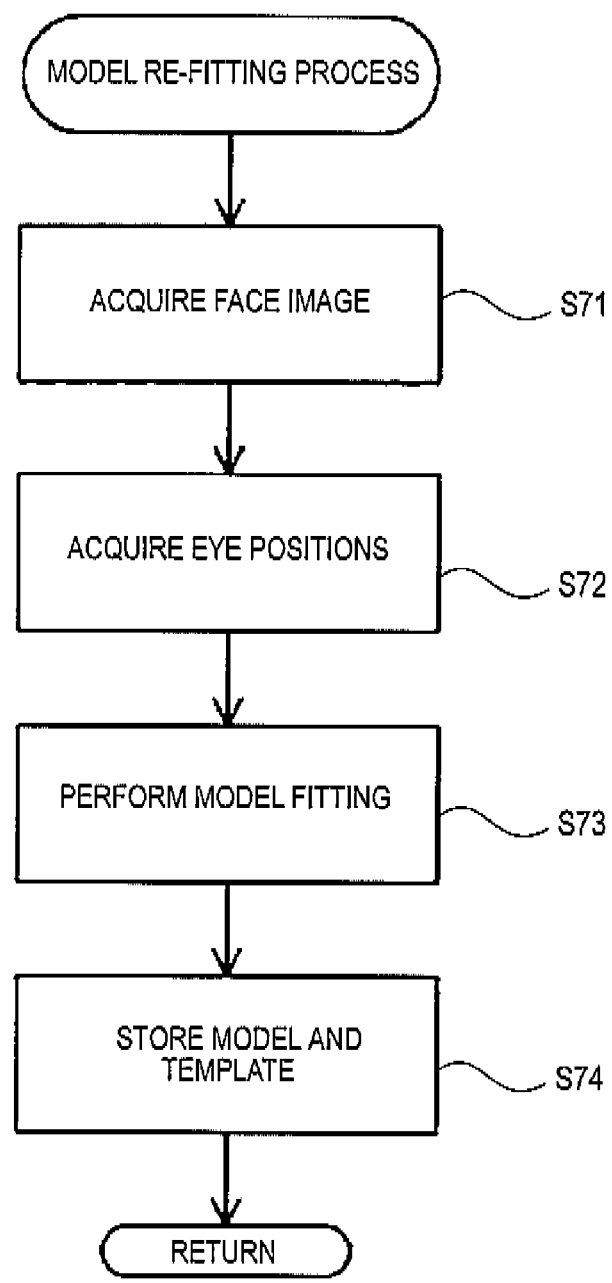

FACE DETECTION APPARATUS, FACE DETECTION METHOD, AND PROGRAM

CROSS REFERENCE TO RELATED APPLICATIONS

This application is based on and claims priority under 35 U.S.C. §119 to Japanese Patent Application 2013-211633, filed on Oct. 9, 2013, the entire contents of which are incorporated herein by reference.

TECHNICAL FIELD

This disclosure relates to a face detection apparatus, a face detection method, and a program capable of detecting a face state from a captured image.

BACKGROUND DISCUSSION

In recent years, a face detection technique of detecting a position and a direction of the face and a state of face parts such as the eyes and the mouth included in a captured still image or moving image has been developed. For example, in a vehicle, inattentive driving or dozing-off while driving is detected by detecting the driver's face, and thus a predetermined action such as triggering an alarm can be performed. In order to perform such detection, the face is required to be detected in real time, but an intensity and a direction of light tend to change inside a vehicle, and the driver's face tends to move due to shaking of a car body. For this reason, particularly, the face detection in a vehicle allows a process to be performed in real time, and is also required to be resistant to noise caused by changes or the like in light and face states.

Stan Z. Li, Anil K. Jain, "Handbook of Face Recognition", Springer, 2011, p, 124 to 133 (Non-patent Reference 1) discloses a lace detection technique (active shape model: ASM, or active appearance model: AAM) of generating a model of the face in an image by fitting a statistical face shape model to the face in the image, that is, performing model fitting by using a steepest descent method or the like. By using this technique, a model of the face in an image is generated, and then the model is continuously fitted to the face in the image, that is, tracking is performed, so that a position and a direction of the face or a state of a face part can be estimated over time.

JP 2008-192100A (Reference 1) discloses a face part detection technique in which changes in an image due to blinking are detected as moving regions by using a difference image between frames, and moving regions having the largest area are specified as eye positions. In a general method of detecting eye positions, the glass frames or the eyebrows are frequently wrongly detected as eye positions, but, by using the technique of Reference 1, it is possible to prevent the glass frames or the eyebrows from being wrongly detected as eye positions and thus to detect eye positions with high accuracy.

In the technique disclosed in Non-patent Reference 1, accuracy of the model fitting is greatly influenced by an initial state of a model, that is, where the model is initially disposed in an image and to which angle and shape the model is set. If the initial state of the model is widely different from an actual state of the face, there is a case where calculation of model fitting for generating the model which is fitted to the actual face ends with a local optimum solution, and thus the model deviates from the actual face and converges. This is referred to as a fitting error, and if the fitting error occurs, accuracy of a model of the face is reduced. Particularly, positions of the eyes of the model tend to wrongly converge on positions of glass frames or the eyebrows. In addition, there is a case where a deviation occurs between the model and the actual face during tracking of the model, and accuracy of the model is reduced. Non-patent Reference 1 does not suggest a method of correcting the model in this case.

In the technique disclosed in Reference 1, since a difference image is easily influenced by noise caused by changes in the intensity and the direction of light and a movement of the face, it is difficult to continuously detect eye positions at all times by using only the difference image. For this reason, in the technique disclosed in Reference 1, there is a concern that eye positions may not be detected while images having a lot of noise are continuously located, and accuracy of a model over time may not be maintained.

SUMMARY

Thus, a need exists for a face detection apparatus, a face detection method, and a program which is not suspectable to the drawback mentioned above.

An aspect of this disclosure is directed to a face detection apparatus detecting a face from an image which includes the face of a target person in a region imaged by an imaging unit, the apparatus including a model fitting unit that generates a first model of the face on the basis of a first image from the imaging unit; a tracking unit that fits the first model to a second image from the imaging unit; a position detection unit that detects positions of face parts of the face on the basis of the second image; and a comparison unit that determines whether or not a deviation occurs between the positions of the face parts in the first model fitted by the tracking unit and the positions of the face parts detected by the position detection unit, in which, when the comparison unit determines that the deviation occurs, the model fitting unit generates a second model of the face on the basis of the second image.

Another aspect of this disclosure is directed to a face detection method including acquiring a first image including the face of a target person in a region from an imaging unit; causing a model fitting unit to generate a first model of the face on the basis of the first image from the imaging unit; acquiring a second image including the face from the imaging unit; causing a tracking unit to fit the first model to the second image; causing a position detection unit to detect positions of face parts of the face on the basis of the second image along with the fitting of the first model; causing a comparison unit to determine whether or not a deviation occurs between the positions of the face parts in the first model fitted by the tracking unit and the positions of the face parts detected by the position detection unit; and causing the model fitting unit to generate a second model of the face on the basis of the second image when the comparison unit determines that the deviation occurs.

Still another aspect of this disclosure is directed to a program for detecting a face from an image which includes the face of a target person in a region imaged by an imaging unit, the program causing a computer to function as a model fitting unit configured to generate a first model of the face on the basis of a first image from the imaging unit; a tracking unit configured to fit the first model to a second image from the imaging unit; a position detection configured to detect positions of face parts of the face on the basis of the second image along with the fitting of the first model performed by the tracking unit; and a comparison unit configured to determine whether or not a deviation occurs between the positions of the face parts in the first model fitted by the tracking unit and the positions of the face parts detected by the position detection unit, in which, when the comparison unit determines that the deviation occurs, the model fitting unit generates a second model of the face on the basis of the second image.

According to the aspects of this disclosure, since model re-fitting is performed in a case where a deviation occurs between eye positions of a model and eye positions detected from an image, it is possible to reduce the deviation of the model from the actual face and thus to maintain a high accuracy state.

BRIEF DESCRIPTION OF THE DRAWINGS

The foregoing and additional features and characteristics of this disclosure will become more apparent from the following detailed description considered with the reference to the accompanying drawings, wherein:

FIG. 12 is a flowchart illustrating a model re-fitting process according to the embodiment disclosed here.

DETAILED DESCRIPTION

Figure 1:
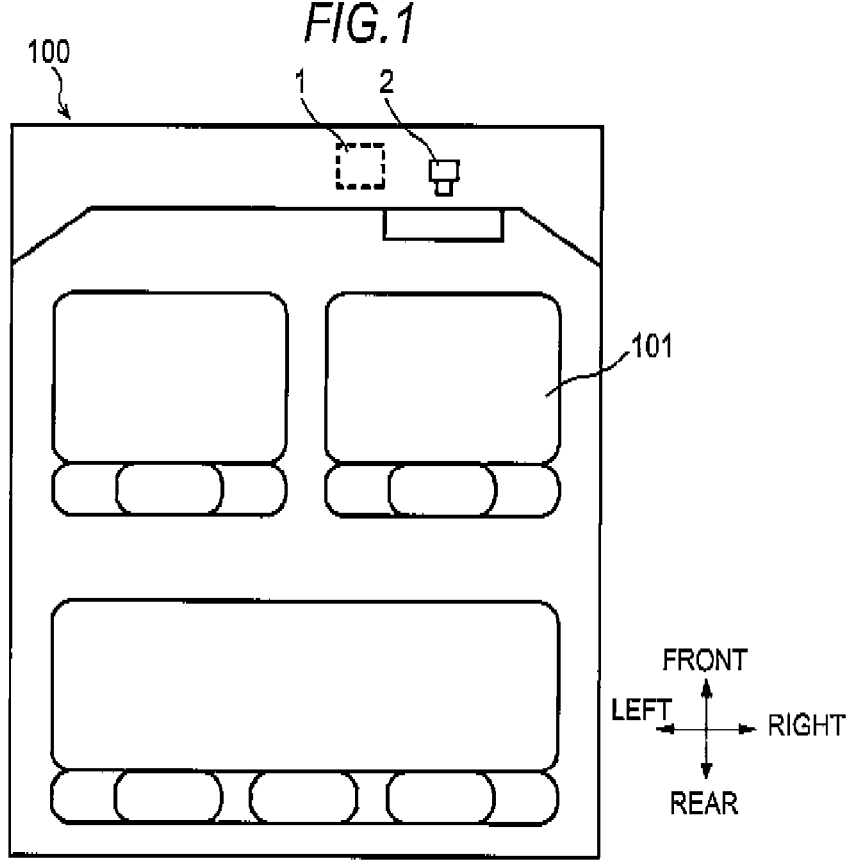
FIG. 1 is a schematic diagram of an interior of a vehicle according to an embodiment disclosed here.

Hereinafter, an embodiment disclosed here will be described with reference to the drawings, but this disclosure is not limited to the embodiment. In the drawings described below, constituent elements having the same functions are given the same reference numerals, and repeated description may be omitted.

FIG. 1 is a schematic diagram illustrating an interior of a vehicle 100 provided with a face detection apparatus 1 according to the present embodiment. The vehicle 100 is provided with the face detection apparatus 1 including an imaging unit 2. The face detection apparatus 1 may be provided at any location in the vehicle 100. The face detection apparatus 1 may be a standalone apparatus, and may be incorporated in another system (for example, a car navigation system) in the vehicle 100.

The imaging unit 2 is provided in front of a driver's seat 101 (that is, in a traveling direction of the vehicle 100) in the vehicle interior. The imaging unit 2 is configured to capture an image of a region including at least the face of a driver who is seated in the driver's seat 101 and is a target person of face detection. In the present embodiment, the imaging unit 2 is provided on a dashboard, but may be provided at a steering wheel, a ceiling, or a rear-view mirror as long as the driver's face can be imaged from the front direction.

Figure 2:
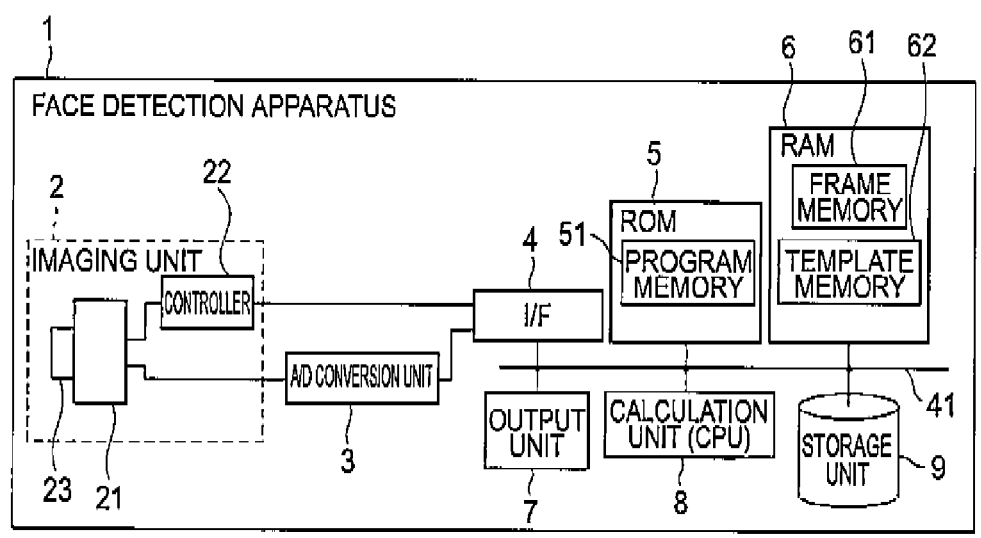
FIG. 2 is a schematic block diagram of a face detection apparatus according to the embodiment disclosed here.

FIG. 2 is a schematic block diagram of the face detection apparatus 1 according to the embodiment disclosed here. The face detection apparatus 1 includes the imaging unit 2 which captures an image of the driver's face. The imaging unit 2 includes a camera 21 provided with a lens 23 and a controller 22. The camera 21 may be a typical visible light CCD camera or CMOS camera, and may be a near infrared CCD camera. The near infrared CCD camera does not depend on individual human skin colors when compared with the visible light CCD camera. In addition, a shutter speed of the near infrared CCD camera can be made higher than a shutter speed of the visible light CCD camera.

The controller 22 controls the camera 21. The controller 22 performs control of opening and closing a shutter of the camera 21 for each predetermined time or in response to a signal from a CPU 8, and records captured image data in a frame memory 61 of a RAM 6 as a frame. In other words, an image captured at a certain point of time is referred to as a frame.

The face detection apparatus 1 includes the calculation unit (CPU) 8, a storage unit 9, a ROM 6, the RAM 6, an output unit 7, an interface (I/F) 4, and a bus 41. The face detection apparatus 1 further includes an A/D conversion unit 3. The respective constituent elements are connected to each other so as to transmit and receive signals via the bus 41.

The calculation unit 8 is constituted by a CPU, and has functions of processing and analyzing digitally converted image data from the imaging unit 2 and of performing processes such as detection of an eye part region and determination of a blinking operation according to programs. The storage unit 9 is constituted by a RAM or the like, and stores image data and can store a processing result, an analysis result, and a determination result of the image data.

The output unit 7 includes, for example, a speaker, a display, and a lamp. The output unit 7 outputs sounds for giving caution or warning from the speaker on the basis of a result of a face detection process according to the present embodiment, or may output a message or light for giving caution or warning from the display or the lamp. In addition, the output unit 7 may transmit, for example, a signal for operating an automatic brake to an automatic brake system of the vehicle 100 on the basis of a result of the face detection process according to the present embodiment.

A speaker provided in the vehicle 100 may be used as the speaker included in the output unit 7. A display of a car navigation system provided in the vehicle 100 may be used as the display included in the output unit 7.

The A/D conversion unit 3 has a function of converting an image signal from the imaging unit 2 into digital image data. The image data is output to the interface (I/F) 4. The I/F 4 transmits and receives data and commands to and from the controller 22, and receives image data therefrom. The ROM 5 is a read only memory, and stores a boot program for starting the face detection apparatus 1, and includes a program memory 51 which stores programs (for example, programs for performing processes illustrated in FIGS. 6 to 9 and 12 described later) for performed processes, analysis and determination. The programs may be stored not in the ROM 5 but in the storage unit 9.

The RAM 6 is used as a cache storage device of the CPU 8, and is also used as a work area when the CPU 8 executes a program for image data. The RAM 6 includes the frame memory 61 which stores image data for each frame, and a template memory 62 which stores a template.

Figure 3:
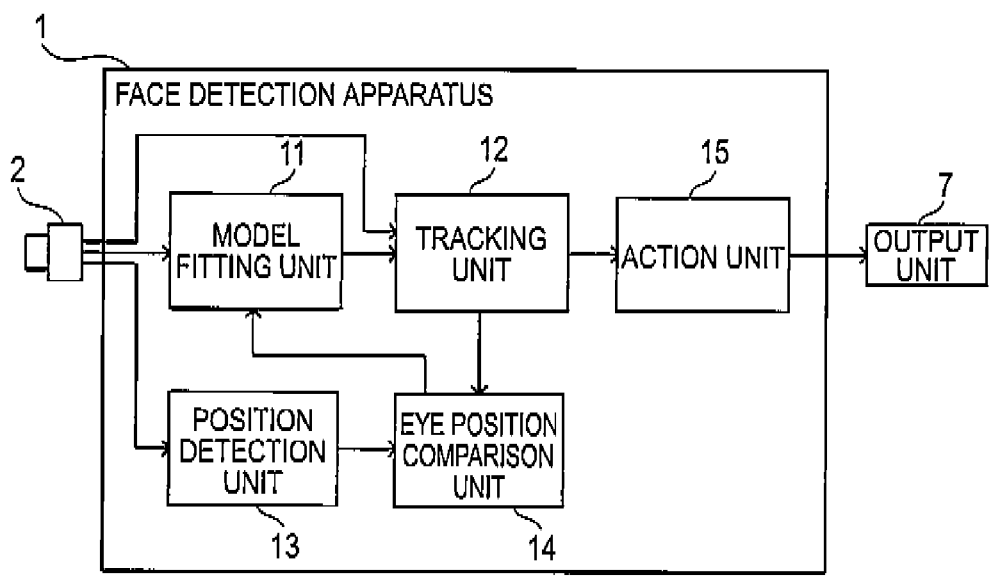
FIG. 3 is a functional block diagram of the face detection apparatus according to the embodiment disclosed here.

FIG. 3 is a functional block diagram of the face detection apparatus 1. The face detection apparatus 1 includes a model fitting unit (model fitting means) 11 which generates a model of the face by using an image from the imaging unit (imaging means) 2; a tracking unit (tracking means) 12 which fits the model generated by the model fitting unit 11 to the image from the imaging unit 2, that is, performs tracking; a position detection unit (position detection means) 13 which detects eye positions by using the image; and an eye position comparison unit (comparison means) 14 which compares eye positions of the model fitted by the tracking unit 12 with the eye positions detected by the position detection unit 13. The model fitting unit 11 performs model fitting when a face detection process is started and when a deviation occurs between eye positions of a model fitted by the tracking unit 12 and eye positions detected by the position detection unit 13. The face detection apparatus 1 further includes an action unit (action means) 15 which performs a predetermined action according to a state of a model output from the tracking unit 12.

In the face detection apparatus 1 according to the present embodiment, each of the model fitting unit 11, the tracking unit 12, the position detection unit 13, the eye position comparison unit 14, and the action unit 15 is stored in the ROM 5 or the storage unit 9 of the face detection apparatus 1 as a program for operating the face detection apparatus 1 which is a computer. In other words, the programs for detecting a face according to the present embodiment are read from the ROM 5 or the storage unit 9 to the RAM 6 by the CPU 8 when executed, and cause the face detection apparatus 1 which is a computer to function as the model fitting unit 11, the tracking unit 12, the position detection unit 13, the eye position comparison unit 14, and the action unit 15. At least some of the model fitting unit 11, the tracking unit 12, the position detection unit 13, the eye position comparison unit 14, and the action unit 15 may be mounted not as programs but as electric circuits. There may be a configuration in which the model fitting unit 11, the tracking unit 12, the position detection unit 13, the eye position comparison unit 14, and the action unit 15 are mounted not in a single apparatus but in a plurality of apparatuses separately, and the plurality of apparatuses operate as the face detection apparatus 1 according to the present embodiment in cooperation with each other.

Figure 4A:
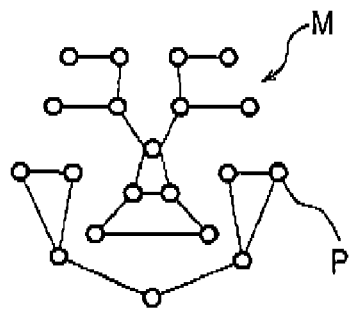
FIG. 4A is a schematic diagram illustrating a model.
Figure 4B:
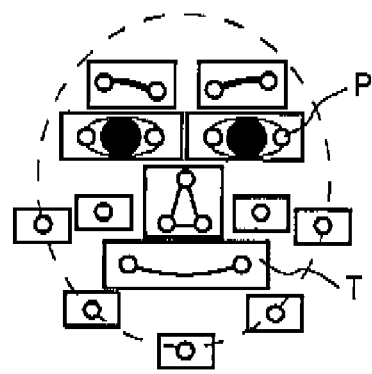
FIG. 4B is a schematic diagram illustrating a template.

FIGS. 4A and 4B are schematic diagrams illustrating a model of the face and a template used in the present embodiment. FIG. 4A is a schematic diagram illustrating an exemplary model M of the face. The model M includes a plurality of feature points P each indicating a predetermined face part. The feature point P is expressed by coordinates with any point as an origin. FIG. 4A illustrates some of the feature points P indicating the eyebrows, the eyes, the nose, the mouth, and contours, but the model M may include more feature points P, and may include feature points P indicating other face parts. In the present embodiment, model fitting includes generating a model M approximate to the face by fitting feature points P of a temporary model to respective parts of the face in an image by using a statistical face shape model, that is, the temporary model of the average face which is created in advance, as an initial state.

In the present embodiment, tracking of a model includes continuously fitting the model M so as to match the face in an image which is periodically captured, after the model M in the model fitting is generated. In the present embodiment, the model tracking is performed by using a template. FIG. 4B is a schematic diagram illustrating a template T created for the model M of the face. The template T has regions with a predetermined range including the feature points P of the model M in an image. For example, the template T has a region including feature points P indicating the eyebrows, a region including feature points P indicating the eyes, a region including feature points P indicating the nose, a region including feature points P indicating the mouth, and a region including feature points P indicating the contours. Each region of the template T corresponds to one or two or more feature points P, and is thus associated with coordinates of the corresponding feature point. In other words, when a position of the region of the template T is defined in an image, coordinates of the feature point P corresponding to the region can be calculated. In the model tracking according to the present embodiment, a position of each region of the template T in an image is determined, and an angle, a position, and a size of the model M in the image are determined by using the position of each region. The determined angle, position and size are applied to the model M, and thus the model M can be fitted to the image. Positions and the number of regions of the template T may be arbitrarily selected as long as model tracking can be performed.

Figure 5A:
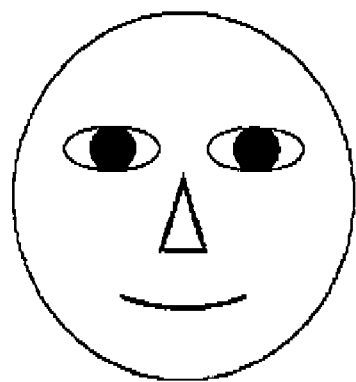
FIG. 5A is a schematic diagram illustrating a face detection process according to the embodiment disclosed here (an image including the face of a target person viewed from a front side)
Figure 5B:
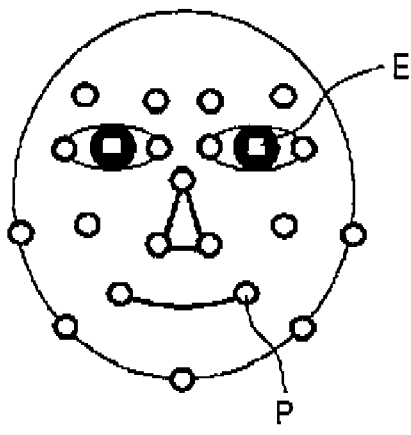
FIG. 5B is a schematic diagram illustrating the face detection process according to the embodiment disclosed here (in a case where eye positions of a model match eye positions of a target person)
Figure 5C:
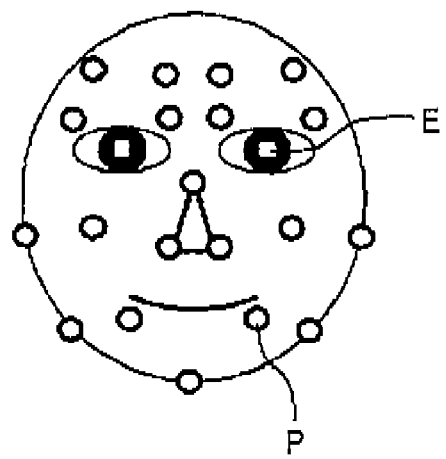
FIG. 5C is a schematic diagram illustrating the face detection process according to the embodiment disclosed here (in a case where eye positions of the model do not match eye positions of the target person)

FIGS. 5A to 5C are schematic diagrams illustrating the face detection process according to the present embodiment. FIG. 5A illustrates an image including the face of a driver viewed from the front side. In FIGS. 5B and 5C, feature points P of a model fitted by the tracking unit 12 are illustrated on the image of the driver, and eye positions E detected by the position detection unit 13 are also illustrated. In FIG. 5B, the feature points P indicating eyes of the model are located at the inner corners of the eyes and the outer corners of the eyes of the driver, and thus the eye positions of the model matches the eye positions E detected by the position detection unit 13. On the other hand, in FIG. 5C, since the feature points P indicating the eyes of the model are located above the driver's eyes, the eye positions of the model do not match the eye positions E detected by the position detection unit 13. In other words, in a state of FIG.

5C, a deviation occurs between the eye positions of the model and the eye positions detected by the position detection unit 13.

In the face detection apparatus 1, the model fitting unit 11 generates a first model on the basis of a first image (that is, an image which is initially acquired by the imaging unit 2), then the tracking unit 12 fits the first model to a second image (that is, an image acquired by the imaging unit 2 after the first model is generated), and, simultaneously, the position detection unit 13 detects eye positions on the basis of the second image. The eye position comparison unit 14 compares eye positions of the first model fitted by the tracking unit 12 with eye positions detected on the basis of the second image by the position detection unit 13, and outputs a comparison result. In a case where there is a deviation between the eye positions of the model fitted by the tracking unit 12 and the eye positions detected on the basis of the second image by the position detection unit 13 on the basis of the comparison result from the eye position comparison unit 14, that is, in a case of the state of FIG. 5C, the model fitting unit 11 generates a new second model by using the eye positions detected by the position detection unit 13. With this configuration, in a case where a fitting error initially occurs or in a case where a deviation occurs between the model and the actual face in the course of model tracking, the model is corrected, and thus it is possible to reduce the deviation between the model and the actual face.

Figure 6:
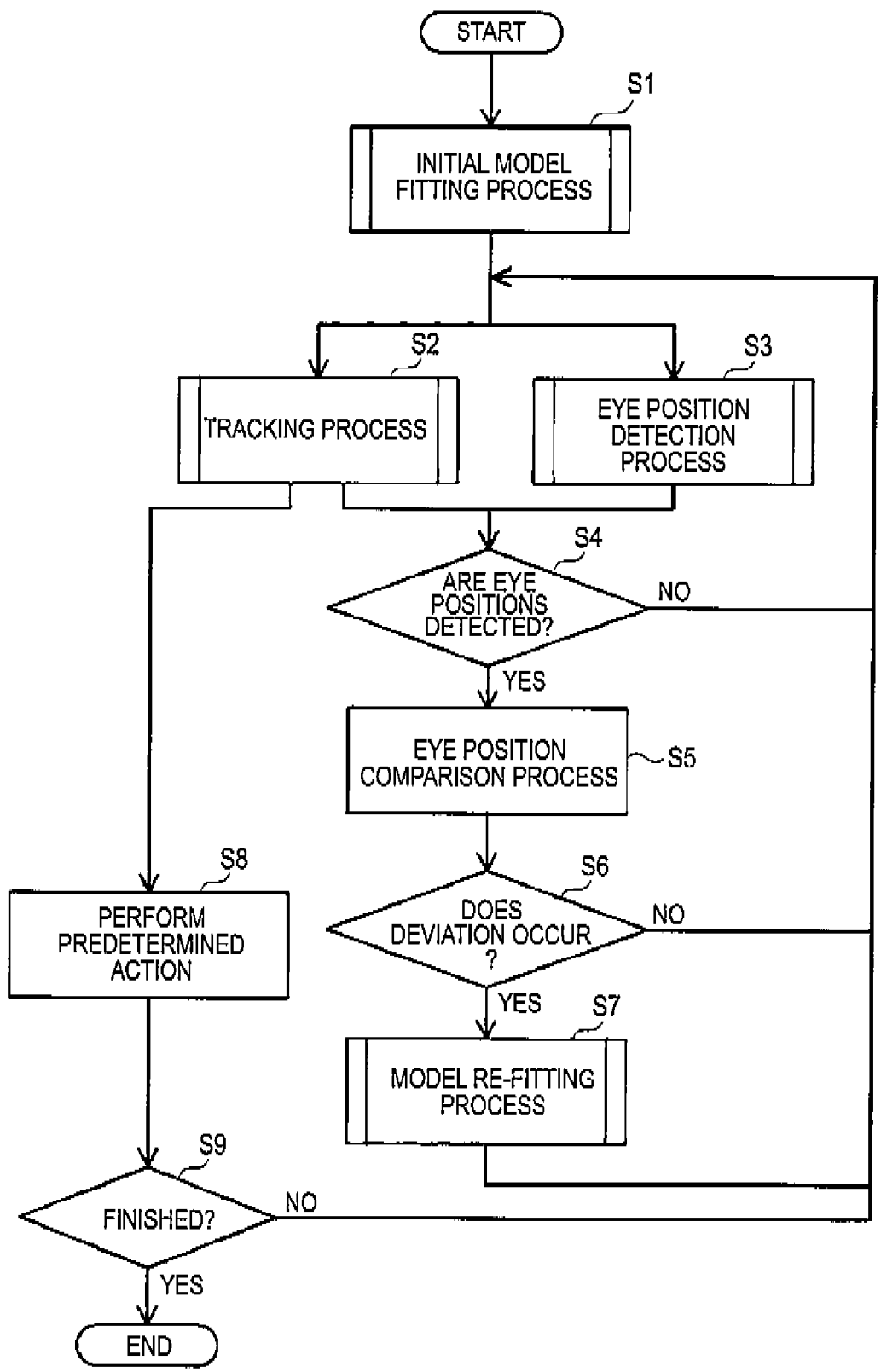
FIG. 6 is a flowchart illustrating the face detection process according to the embodiment disclosed here.

FIG. 6 is a flowchart illustrating the face detection process according to the present embodiment. The face detection apparatus 1 starts the face detection process of the flowchart of FIG. 6 when detecting that a predetermined start condition (for example, seating of a driver, turning-on of an ignition key or a specific switch by the driver, or the like) is satisfied. An image (that is, an image including the driver's face) used in each step of the face detection process may be captured by sending a signal from the CPU 8 to the imaging unit 2 when each step is performed, or may be autonomously captured by the imaging unit 2 in a predetermined cycle. In either case, an image captured by the imaging unit 2 is stored in the frame memory 61 of the RAM 6, and is read from the frame memory 61 of the RAM 6 in each step. The frame memory 61 of the RAM 6 holds at least images of a frame which is a process target and the previous frame of the frame which is a process target.

First, the face detection apparatus 1 performs an initial model fitting process by using the model fitting unit 11 on the basis of an image captured by the imaging unit 2, so as to generate a model (step S1). Then, the tracking unit 12 performs a tracking process with the next frame as a process target frame on the basis of the image and the model generated through the initial model fitting process, so as to fit the model to the image (step S2). Along with the tracking process, the face detection apparatus 1 performs an eye position detection process by using the position detection unit 13 on the basis of the image of the same process target frame as that used in the tracking process, so as to detect eye positions in the images (step S3). In the present embodiment, the tracking process and the eye position detection process are repeatedly performed in the same cycle, but a cycle of the tracking process may be shorter than a cycle of the eye position detection process. For example, a cycle of the tracking process may be ½ or ⅓ of a cycle of the eye position detection process. In this case, when the tracking process is performed twice or three times, the eye position detection process is performed once.

If eye positions are not detected in the process target frame in the eye position detection process (step S3), that is, blinking is not detected (NO in step S4), the face detection apparatus 1 performs the tracking process (step S2) and the eye position detection process (step S3) with the next frame as a process target frame.

If eye positions are detected in the process target frame in the eye position detection process (step S3) (YES in step S4), the face detection apparatus 1 performs an eye position comparison process by using the eye position comparison unit 14, and determines whether or not a deviation occurs between the eye positions of the model and the eye positions of the image (step S5).

If it is determined in the eye position comparison process (step S5) that a deviation does not occur between the eye positions of the model and the eye positions of the image (NO in step S6), the face detection apparatus 1 performs the tracking process (step S2) and the eye position detection process (step S3) with the next frame as a process target frame. Here, in a case where the model is set in a temporary detection state in the initial model fitting process, the temporary detection state is canceled. This is because it is confirmed that accuracy of the model is sufficiently high through the eye position comparison process.

If it is determined in the eye position comparison process (step S5) that a deviation occurs between the eye positions of the model and the eye positions of the image (YES in step S6), the face detection apparatus 1 performs a model re-fitting process by using the model fitting unit 11 on the basis of the eye positions detected by the position detection unit 13, so as to generate a new model, that is, to update the model (step S7). Then, the face detection apparatus 1 performs the tracking process (step S2) and the eye position detection process (step S3) with the next frame as a process target frame. Here, in a case where the model is set to a temporary detection state in the initial model fitting process, the temporary detection state is canceled. This is because the model is corrected in the model re-fitting process and thus accuracy of the model is ensured.

Independent from the flow from the eye position detection process (step S3) to the model re-fitting process (step S7), the face detection apparatus 1 performs a predetermined action by using the action unit 15 on the basis of the model fitted in the tracking process (step S2) (step S8). For example, the action unit 15 may determine that the driver is in an inattentive driving state in a case where the model fitted in the tracking process is not directed toward the front side, and may output sounds or output a message or light from the output unit 7 for giving a warning. In addition, the action unit 15 may determine that the driver is in a dozing-off state while driving in a case where the model fitted in the tracking process remains in a state in which the eyes are closed for a predetermined time or more, and may output sounds or output a message or light from the output unit 7 for giving the warning. Further, the action unit 15 may perform an operation of an automatic brake system on the basis of determination of the inattentive driving state or the dozing-off state while driving.

Here, in a case where the model is set in a temporary detection state in the initial model fitting process, the action unit 15 may not perform the above-described predetermined action, or may perform actions different from the predetermined action. This is because, in the temporary detection state, accuracy of model fitting is low, and it cannot be said that the model is necessarily approximate to the actual face. The action unit 15 may output sounds and light but may not operate the automatic brake in a case where the model is set in the temporary detection state.

Finally, the face detection apparatus 1 finishes the execution of the face detection process when detecting that a predetermined end condition (for example, leaving the driver's seat, turning-off of the ignition key or a specific switch by the driver, or the like) is satisfied (YES in step S9). If the end condition is not satisfied, the face detection apparatus 1 performs the tracking process (step S2) and the eye position detection process (step S3) with the next frame as a process target frame (NO in step S9).

Figure 7:
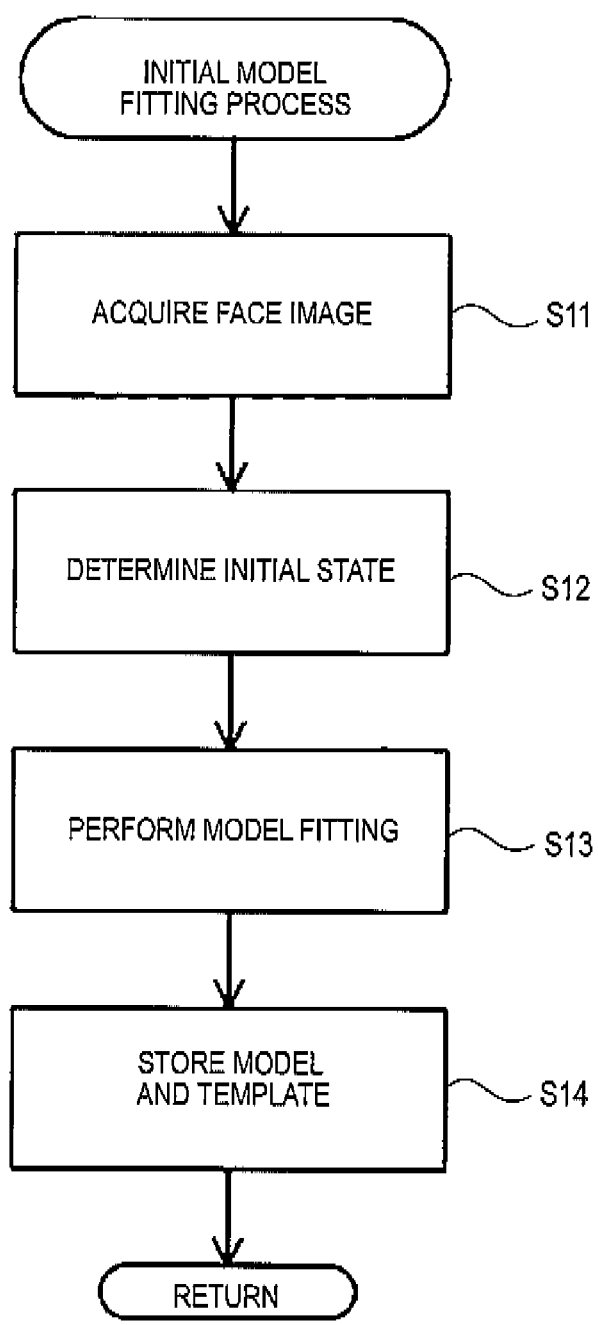
FIG. 7 is a flowchart illustrating an initial model fitting process according to the embodiment disclosed here.

FIG. 7 is a flowchart illustrating details of the initial model fitting process according to the present embodiment. In the initial model fitting process, the model fitting unit 11 acquires the image of the frame at the time of starting of the face detection process, from the frame memory 61 of the RAM 6 (step S11), and determines a model initial state on the basis of the image (step S12). The determination of the model initial state includes determination of positions, angles, and the like of the model at a point of time before model fitting is performed. A method of determining the model initial state in the present embodiment is not limited to a specific method, and any face and face part detection method such as a neural network method or AdaBoost method may be used.

According to the present embodiment, in the model re-fitting process (step S7), it is possible to perform accurate model re-fitting. For this reason, in the initial model fitting process, accuracy of a model initial state may not necessarily be high, and thus a model initial state can be used which causes a small processing load, that is, which allows a process to be performed fast. Consequently, it is possible to start model tracking at an earlier timing.

The model fitting unit 11 performs model fitting on the image acquired in step S11 by using the model initial state determined in step S12 so as to generate a model (step S13). A method of fitting a model in the present embodiment is not limited to a specific method, and any model fitting method such as an active appearance model (AAM) method or an active shape model (ASM) method may be used. The model fitting unit 11 stores the model generated through the model fitting in the RAM 6.

As described above, since accuracy of a model initial state in the initial model fitting process according to the present embodiment is not high, a fitting error tends to occur. For this reason, the model generated through the initial model fitting process is set in a temporary detection state. Whether or not a model is in a temporary detection state is used for determination of execution of an action (step S8).

The model fitting unit 11 stores a model and a template used for the tracking process by using the image acquired in step S11 and the model generated in step S13 (step S14). For example, the model fitting unit 11 stores the template T, illustrated in FIG. 4B, having the region including the feature points P indicating the eyebrows, the region including the feature points P indicating the eyes, the region including the feature points P indicating the nose, the region including the feature points P indicating the mouth, and the region including the feature points P indicating the contours, in the template memory 62 of the RAM 6, and stores the model in the RAM 6. Positions and the number of regions of the template T may be arbitrarily selected as long as model tracking can be performed.

Figure 8:
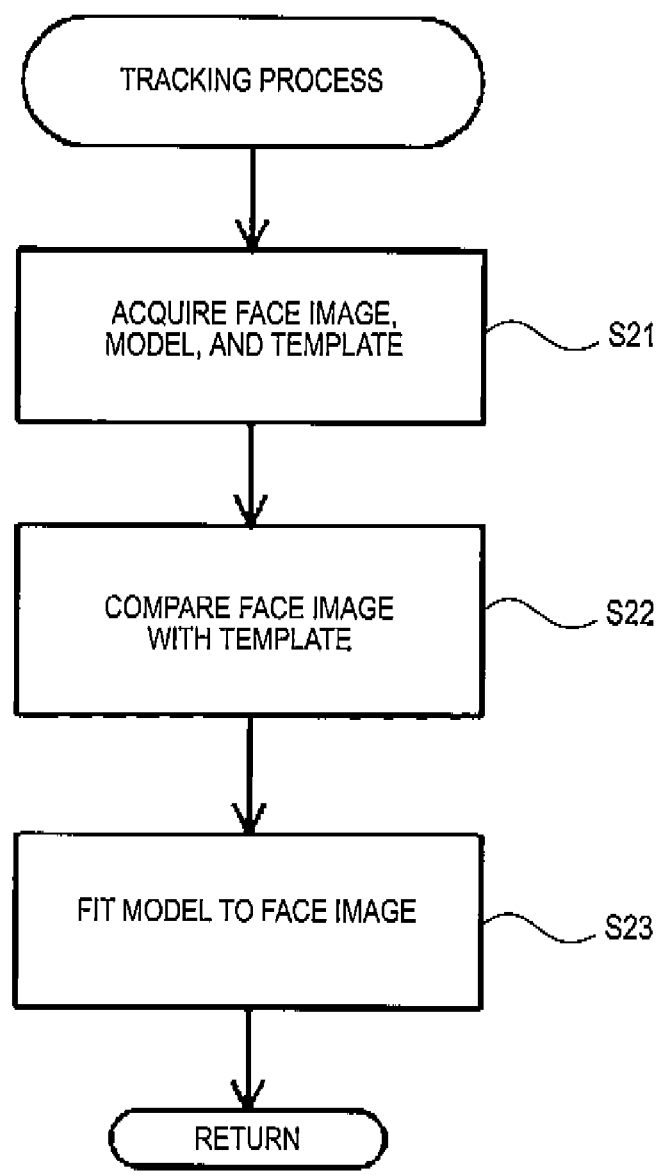
FIG. 8 is a flowchart illustrating a tracking process according to the embodiment disclosed here.

FIG. 8 is a flowchart illustrating details of the tracking process (step S2) according to the present embodiment. In the tracking process, the tracking unit 12 acquires the image of the process target frame, the model, and the template from the RAM 6 (step S21), and compares the image with the template (step S22). Specifically, the tracking unit 12 scans each region of the template onto the image and compares the region with the image at each position on the basis of the image of the process target frame read from the frame memory 61 of the RAM 6, and the template read from the template memory 62 of the RAM 6. As a result of the comparison, the tracking unit 12 determines a position of each region of the template by using the most approximate position, and stores the template to which the position is applied in the template memory 62 of the RAM 6. Then, the tracking unit 12 determines angles, positions, and size of the model associated with each region of the template on the basis of the model read from the RAM 6 and the template stored in step S22, and stores the model to which the angles, the positions, and the size are applied in the RAM 6 (step S23). As a result, the model is fitted (tracked) to the image of the process target frame.

Since the tracking process is performed by using a template in the present embodiment, the tracking can be performed with a low processing load simply by comparing the template with an image. In addition, the tracking process may be performed in a method of not using a template. For example, although a processing load increases, the tracking process may be performed by using a model as it is. In this case, the acquisition of a template (steps S14 and S74) is not necessary. Any tracking method may be used according to the balance between required accuracy and a processing load.

Figure 9:
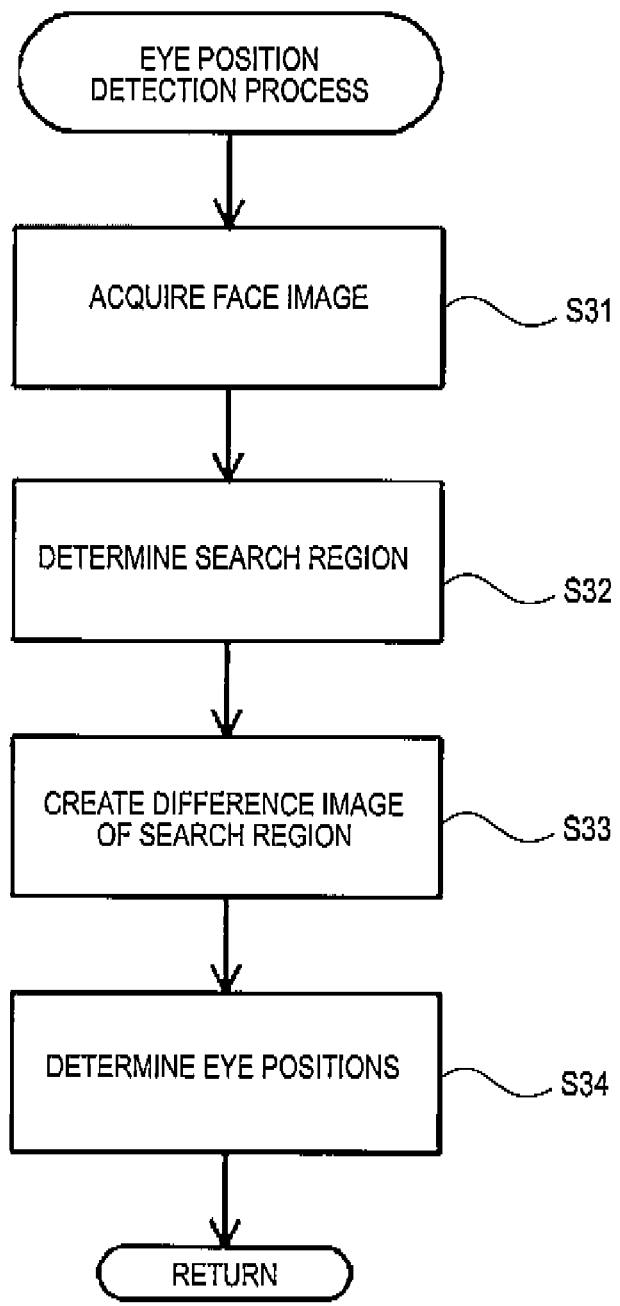
FIG. 9 is a flowchart illustrating an eye position detection process according to the embodiment disclosed here.

FIG. 9 is a flowchart illustrating details of the eye position detection process (step S3) according to the present embodiment. The position detection unit 13 acquires the image of the process target frame and the image of the previous frame of the process target frame from the frame memory 61 of the RAM 6 (step S31). A process target frame in the eye position detection process is the same as a process target frame in the tracking process which is simultaneously performed.

The position detection unit 13 reads the model which is fitted in the tracking process (step S2) from the RAM 6, and determines a search region in the image acquired in step S31 (step S32). The position detection unit 13 determines a peripheral region of feature points as a search region on the basis of positions of the feature points indicating the eyes (that is, the inner corners of the eyes, the outer corners of the eyes, or the like) of the model. The search region is, for example, a region including points which are separated by predetermined distances from the feature points indicating the eyes, used as a reference, in the vertical direction and the horizontal direction. Since a fitting error related to feature points indicating the eyes frequently occurs in parts around the eyes, such as the glass frames or the eyebrows, there is a high probability that the eyes of the actual face are located in the search region even if a deviation occurs between the model used to determine a search region and the actual face. The search region is required to have a shape and a size in which a probability of the eyes being located therein is sufficiently high, and the shape and the size may be statistically determined.

Next, the position detection unit 13 creates a difference image of the search regions determined in step S32 by using the images acquired in step S31 (step S33). Specifically, the position detection unit 13 calculates differences in luminance components between the search region in the image of the previous frame and the search region in the image of the process target frame. Consequently, a difference image of the search regions, for example, illustrated in FIG. 10C, is created.

Figure 10A:
FIG. 10A is a schematic diagram illustrating an eye position detection method according to the embodiment disclosed here (in a case where a target person is in a state in which the eyes are closed)
Figure 10B:
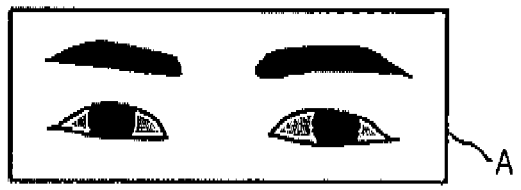
FIG. 10B is a schematic diagram illustrating the eye position detection method according to the embodiment disclosed here (in a case where the target person is in a state in which the eyes are open)
Figure 10C:
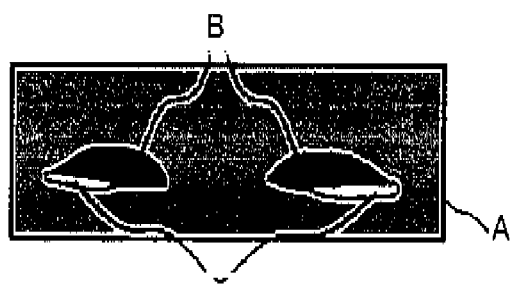
FIG. 10C is a schematic diagram illustrating the eye position detection method according to the embodiment disclosed here (a difference image between an image in a state in which the eyes are open and an image in a state in which the eyes are closed)

FIGS. 10A to 10C are schematic diagrams illustrating an eye position detection method according to the present embodiment. FIG. 10A illustrates a search region A in an image in a case where a driver is in a state in which the eyes are closed. FIG. 10B illustrates the search region A in the image in a case where the driver is in a state in which the eyes are open. FIG. 10C illustrates a difference image created by subtracting luminance components of the search region A of FIG. 10A from luminance components of the search region A of FIG. 10B. The difference image has a region in which luminance decreases (a black region B), a region in which luminance increases (a white region C), and a region in which luminance scarcely changes. If an eye state transitions from a state in which the eyes are closed to a state in which the eyes are open due to blinking, the large black regions B appear at positions corresponding to the eyelids in the difference image. For this reason, the position detection unit 13 determines the black regions B having an area larger than a predetermined area in the difference image created in step S33, as eye positions, and stores the eye positions in the RAM 6 (step S34). The eye positions are respectively coordinates of, for example, centroids of the black regions B. In a case where there is no black region B having an area larger than the predetermined area in the difference image, the position detection unit 13 determines that blinking is not performed in the frame, and does not detect eye positions. Transition from a state in which the eyes are open to a state in which the eyes are closed may be used to detect eye positions, and, in this case, the white regions C having an area larger than a predetermined area may be determined as the eye positions.

FIG. 10C illustrates a schematic difference image, and a plurality of black regions B may appear in parts other than the eyes in an actual difference image. In this case, the position detection unit 13 estimates black regions having the largest area as the eyes. In a case where sizes of the estimated left and right eyes are different from each other, or a gap therebetween is abnormal, for example, the gap is out of a predetermined allowable range, the position detection unit 13 estimates black regions having the second largest area as the eyes.

In the eye position detection process (step S3) according to the present embodiment, changes in the eyes due to blinking are detected by using a difference image. For this reason, it is possible to prevent the eyebrows or the glass frames from being wrongly detected as eye positions, and thus to estimate eye positions with high accuracy. In addition, since a search region is restricted on the basis of a tracked model, the eye position detection process is performed only within the search region, it is possible to reduce a processing load, and also to further improve accuracy of detection of eye positions by reducing noise due to face parts other than the eyes. An eye position detection method used in the present embodiment is not limited thereto, and any face part detection method may be used in which a nose position can be specified from an image in consideration of detection accuracy and a processing load.

A frame acquisition cycle is a duration in which human blinking can be detected, that is, the duration in which an eye state changes between a state in which the eyes are open and a state in which the eyes are closed from the previous frame to a process target frame. A specific numerical value of the frame acquisition cycle may be set on the basis of statistics or through tests, and the face detection apparatus 1 may set the frame acquisition cycle on the basis of a frequency of blinking of a driver.

Figure 11:
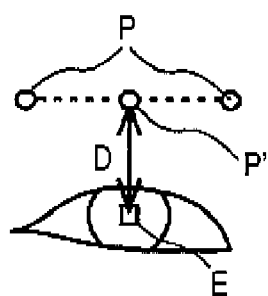
FIG. 11 is a schematic diagram illustrating an eye position comparison method according to the embodiment disclosed here.

FIG. 11 is a schematic diagram illustrating an eye position comparison method in the eye position comparison process (step S5) according to the present embodiment. The eye position comparison unit 14 acquires the model fitted through the tracking process (step S2), from the RAM 6. The eye position comparison unit 14 acquires the eye positions detected through the eye position detection process (step S3), from the RAM 6. As illustrated in FIG. 11, the eye position comparison unit 14 estimates a midpoint of the feature points P indicating the inner corner of the eye and the outer corner of the eye as an eye position P' of the model on the basis of the feature points P indicating the inner corner of the eye and the outer corner of the eye of the model which is fitted through the tracking process. The eye position comparison unit 14 calculates a distance D between the eye position P' of the tracked model and the eye position E detected through the eye position detection process. In a case where the distance D is greater than a predetermined threshold value D0, the eye position comparison unit 14 determines that there is the occurrence of a deviation between the eye position of the tracked model and the eye position detected through the eye position detection process, and in a case where the distance is equal to or smaller than the threshold value, the eye position comparison unit 14 determines that there is no occurrence of a deviation between the eye position of the tracked model and the eye position detected through the eye position detection process. The predetermined threshold value D0 may be arbitrarily set in consideration of a necessary frequency of model re-fitting and a process load.

FIG. 12 is a flowchart illustrating details of the model re-fitting process (step S7) according to the present embodiment. In the model re-fitting process, the model fitting unit 11 acquires the image from the frame memory 61 of the RAM 6 (step S71). A process target frame of the model re-fitting process is the same as a process target frame of the tracking process and the eye position detection process.

Next, the model fitting unit 11 acquires the eye positions detected in the eye position detection process (step S3) from the RAM 6 (step S72). Then, the model fitting unit 11 performs model fitting on the image acquired in step S71 by using the eye positions acquired in step S72 as a model initial state, so as to generate a new model, that is, to update the model (step S73). The model fitting unit 11 stores the new model generated through the model fitting, in the RAM 6. Here, the eye positions detected through the eye position detection process are used as a model initial state. In the eye position detection process, as described above, changes in the eyes due to blinking are detected by using a difference image, and thus it is possible to specify eye positions with high accuracy. By using the eye positions as a model initial state, a model initial state in the model re-fitting process can be set to be approximate to an actual face state, and thus accuracy of the model fitting is improved.

Also in the model fitting in the model re-fitting process, in the same manner as in the initial model fitting process, any model fitting method such as an active appearance model (AAM) method or an active shape model (ASM) method may be used. As a model initial state, a model initial state determined according to any face and face part detection method such as a neural network method or an AdaBoost method as in the initial model fitting process may be combined with the eye positions detected through the eye position detection process and may be used. Consequently, accuracy of the model fitting can be further improved.

Information used for the model refitting process is not limited to eye positions estimated by using a difference image. The spirit of this disclosure is that a position of a face part is detected from an image along with tracking of a model generated from the image, and the model is corrected on the basis of the position of the face part. In other words, two different information pieces are generated on the basis of an image from a single imaging unit, and improvement in accuracy of face detection is realized by using the information in a complementary manner. As a result, since an estimation result based on two different information pieces is confirmed again, accuracy of the face detection is improved. As long as a position of a face part can be specified from an image, not only the eyes but also any face part such as the nose, the mouth, the ears, and the contours may be used, and a combination of a plurality of face parts may be used.

After the model is corrected in step S73, the model fitting unit 11 stores the template used for the tracking process in the template memory 62 of the RAM 6 and stores the model in the RAM 6 in the same manner as in step S14 by using the image acquired in step S71 and the model generated in step S73 (step S74).

In the face detection process according to the present embodiment, since eye positions are detected from an image along with model tracking, and model fitting is performed again by using the estimated eye positions, it is possible to correct a fitting error and a deviation in the tracking, and thus to improve accuracy of a model over time. In addition, since an additional mechanism such as a visual line detector (eye tracker) is not necessary, and both model tracking and eye position detection are performed by using an image from a single imaging unit, it is possible to minimize an increase in cost required to improve accuracy.

In the face detection process according to the present embodiment, since the model re-fitting process is performed only in a case where a deviation occurs between eye positions of a model which is currently being tracked and eye positions detected from an image, a wasteful process can be omitted, and an increase in a processing load can be minimized.

In the face detection process according to the present embodiment, since a rough initial model fitting process is performed before eye position detection which takes time in order to wait for blinking is completed, model tracking can be started at an earlier timing and thus waiting time can be reduced.

In the face detection process according to the present embodiment, since changes in the eyes due to blinking are detected by creating a difference image between frames, and thus eye positions are detected, it is possible to prevent the eyebrows or the glass frames from being wrongly detected as eye positions, and thus to estimate eye positions with high accuracy. In this case, since a search region in an image is restricted during creation of the difference image on the basis of eye positions of a model which is currently being tracked, it is possible to reduce a processing load.

This disclosure is not limited to the above-described embodiment, and may be appropriately modified within the scope without departing from the spirit of this disclosure.

The scope of the above-described embodiment also includes a process method in which a program (for example, a program for performing the processes illustrated in FIGS. 6 to 9 and 12) for operating the constituent elements of the embodiment so as to realize the functions of the embodiment is stored on a storage medium, and the program stored on the storage medium is read to a computer and is executed in the computer. In other words, a computer readable storage medium is included in the scope of an embodiment disclosed here. In addition, not only a storage medium storing the above-described program but also the program itself is included in the above-described embodiment. As such a storage medium, for example, a floppy (registered trademark) disk, a hard disk, an optical disc, a magneto-optical disc, a CD-ROM, a magnetic tape, a nonvolatile memory card, or a ROM may be used. Further, the scope of the embodiment includes not only the program alone stored on the above-described storage medium performing the processes but also the program being operated on an OS in cooperation with other software or functions of an extension board so as to perform the operation of the embodiment.

The above-described embodiment includes the following appendixes.

APPENDIX 1

A face detection method including acquiring a first image including a face of a target person in a region from an imaging unit; causing a model fitting unit to generate a first model of the face on the basis of the first image from the imaging unit; acquiring a second image including the face from the imaging unit; causing a tracking unit to fit the first model to the second image; causing a position detection unit to detect positions of face parts of the face on the basis of the second image along with the fitting of the first model; causing a comparison unit to determine whether or not a deviation occurs between the positions of the face parts in the first model fitted by the tracking unit and the positions of the face parts detected by the position detection unit; and causing the model fitting unit to generate a second model of the face on the basis of the second image when the comparison unit determines that the deviation occurs.

APPENDIX 2

The face detection method according to Appendix 1, in which the face parts include the eyes, and in which the position detection unit creates a difference image between an image from the imaging unit of a certain frame and an image from the imaging unit of the previous frame, and detects positions of the eyes on the basis of the difference image.

APPENDIX 3

The face detection method according to Appendix 2, in which the position detection unit determines a search region on the basis of positions of the eyes of the first model fitted by the tracking unit, and creates the difference image in the search region.

APPENDIX 4

The face detection method according to Appendix 1, in which the first model includes feature points indicating the face parts, in which the model fitting unit stores regions including the feature points in the first image as a template, and in which the tracking unit determines a position of the template on the basis of the second image, and fits the first model to the second image on the basis of the determined position of the template.

APPENDIX 5

The face detection method according to Appendix 4, in which each region of the template corresponds to one or two or more feature points, and is thus associated with coordinates of the feature points.

APPENDIX 6

A program for detecting the face from an image which includes a face of a target person in a region imaged by an imaging unit, the program causing a computer to function as a model fitting unit configured to generate a first model of the face on the basis of a first image from the imaging unit; a tracking unit configured to fit the first model to a second image from the imaging unit; a position detection unit configured to detect positions of face parts of the face on the basis of the second image along with the fitting of the first model performed by the tracking unit; and a comparison unit configured to determine whether or not a deviation occurs between the positions of the face parts in the first model fitted by the tracking unit and the positions of the face parts detected by the position detection unit, in which, when the comparison unit determines that the deviation occurs, the model fitting unit generates a second model of the face on the basis of the second image.

APPENDIX 7

The program according to Appendix 6, in which the face parts include the eyes, and in which the position detection unit creates a difference image between an image from the imaging unit of a certain frame and an image from the imaging unit of the previous frame, and detects positions of the eyes on the basis of the difference image.

APPENDIX 8

The program according to Appendix 7, in which the position detection unit determines a search region on the basis of positions of the eyes of the first model fitted by the tracking unit, and creates the difference image in the search region.

APPENDIX 9

The program according to Appendix 6, in which the first model includes feature points indicating the face parts, in which the model fitting unit stores regions including the feature points in the first image as a template, and in which the tracking unit determines a position of the template on the basis of the second image, and fits the first model to the second image on the basis of the determined position of the template.

APPENDIX 10

The face detection method according to Appendix 9, in which each region of the template corresponds to one or two or more feature points, and is thus associated with coordinates of the feature points.

APPENDIX 11

A computer readable storage medium storing the program according to any one of Appendixes 6 to 10.

An aspect of this disclosure is directed to a face detection apparatus detecting a face from an image which includes the face of a target person in a region imaged by an imaging unit, the apparatus including a model fitting unit that generates a first model of the face on the basis of a first image from the imaging unit; a tracking unit that fits the first model to a second image from the imaging unit; a position detection unit that detects positions of face parts of the face on the basis of the second image; and a comparison unit that determines whether or not a deviation occurs between the positions of the face parts in the first model fitted by the tracking unit and the positions of the face parts detected by the position detection unit, in which, when the comparison unit determines that the deviation occurs, the model fitting unit generates a second model of the face on the basis of the second image.

In the face detection apparatus according to the aspect of this disclosure, the face parts may include the eyes, and the position detection unit may create a difference image between an image from the imaging unit of a certain frame and an image from the imaging unit of the previous frame, and detects positions of the eyes on the basis of the difference image.

In the face detection apparatus according to the aspect of this disclosure, the position detection unit may determine a search region on the basis of positions of the eyes of the first model fitted by the tracking unit, and creates the difference image in the search region.

In the face detection apparatus according to the aspect of this disclosure, the first model may include feature points indicating the face parts, the model fitting unit may store regions including the feature points in the first image as a template, and the tracking unit may determine a position of the template on the basis of the second image, and fit the first model to the second image on the basis of the determined position of the template.

In the face detection apparatus according to the aspect of this disclosure, each region of the template may correspond to one or two or more feature points, and may be thus associated with coordinates of the feature points.

Another aspect of this disclosure is directed to a face detection method including acquiring a first image including the face of a target person in a region from an imaging unit; causing a model fitting unit to generate a first model of the face on the basis of the first image from the imaging unit; acquiring a second image including the face from the imaging unit; causing a tracking unit to fit the first model to the second image; causing a position detection unit to detect positions of face parts of the face on the basis of the second image along with the fitting of the first model; causing a comparison unit to determine whether or not a deviation occurs between the positions of the face parts in the first model fitted by the tracking unit and the positions of the face parts detected by the position detection unit; and causing the model fitting unit to generate a second model of the face on the basis of the second image when the comparison unit determines that the deviation occurs.

Still another aspect of this disclosure is directed to a program for detecting a face from an image which includes the face of a target person in a region imaged by an imaging unit, the program causing a computer to function as a model fitting unit configured to generate a first model of the face on the basis of a first image from the imaging unit; a tracking unit configured to fit the first model to a second image from the imaging unit; a position detection unit configured to detect positions of face parts of the face on the basis of the second image along with the fitting of the first model performed by the tracking unit; and a comparison unit configured to determine whether or not a deviation occurs between the positions of the face parts in the first model fitted by the tracking unit and the positions of the face parts detected by the position detection unit, in which, when the comparison unit determines that the deviation occurs, the model fitting unit generates a second model of the face on the basis of the second image.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A face detection apparatus detecting a face from an image which includes the face of a target person in a region imaged by an imaging unit, the apparatus comprising:
    a model fitting unit that generates a first model of the face on the basis of a first image from the imaging unit, the first model including model face parts;
    a position detection unit that detects positions of image face parts of the face on the basis of a second image from the imaging unit; and
    a comparison unit that determines whether or not a deviation occurs between the positions of the model face parts in the first model and the positions of corresponding image face parts of the second image detected by the position detection unit,
    wherein, when the comparison unit determines that the deviation occurs, the model fitting unit generates a second model of the face with positions of the model face parts updated on the basis of the second image.

2. The face detection apparatus according to claim 1,
    wherein the model face parts and the image parts each include the eyes, and
    the position detection unit creates a difference image between an image from the imaging unit of a certain frame and an image from the imaging unit of a previous frame, and detects positions of the eyes on the basis of the difference image.

3. The face detection apparatus according to claim 2,
    wherein the position detection unit determines a search region on the basis of positions of the eyes of the first model fitted by the tracking unit, and creates the difference image in the search region.

4. The face detection apparatus according to claim 1,
    wherein the first model includes feature points indicating the locations of the model face parts,
    the model fitting unit stores a template including regions respectively corresponding to at least one of the feature points in the first model, and
    further comprising a tracking unit that determines a position to provide the template on the second image on the basis of the second image, and provides the first model on the second image on the basis of the determined position of the template.

5. The face detection apparatus according to claim 4,
    wherein each region of the template corresponds to one or two or more feature points, and is thus associated with coordinates of the feature points.

6. A face detection method comprising:
    acquiring a first image including a face of a target person in a region from an imaging unit;
    causing a model fitting unit to generate a first model of the face on the basis of the first image from the imaging unit, the first model including model face parts;
    acquiring a second image including the face from the imaging unit;
    causing a position detection unit to detect positions of image face parts of the face on the basis of the second image along with the fitting of the first model;
    causing a comparison unit to determine whether or not a deviation occurs between the positions of the model face parts in the first model and the positions of corresponding image face parts of the second image detected by the position detection unit; and
    causing the model fitting unit to generate a second model of the face with positions of the model face parts updated on the basis of the second image when the comparison unit determines that the deviation occurs.

7. A non-transitory computer-readable medium storing a program for detecting a face from an image which includes the face of a target person in a region imaged by an imaging unit, the program causing a computer to function as:
    a model fitting unit configured to generate a first model of the face on the basis of a first image from the imaging unit, the first model including model face parts;
    a position detection unit configured to detect positions of image face parts of the face on the basis of a second image from the imaging unit along with the fitting of the first model performed by the tracking unit; and
    a comparison unit configured to determine whether or not a deviation occurs between the positions of the model face parts in the first model and the positions of corresponding image face parts of the second image detected by the position detection unit,
    wherein, when the comparison unit determines that the deviation occurs, the model fitting unit generates a second model of the face with positions of the model face parts updated on the basis of the second image.

* * * * *